United States Patent
Chang et al.

(10) Patent No.: US 7,847,902 B2
(45) Date of Patent: Dec. 7, 2010

(54) LIQUID CRYSTAL DISPLAY WITH SCANNING LINES EACH HAVING DUAL PATHS

(75) Inventors: Chia-Wen Chang, MiaoLi (TW); Chin-Chang Chen, MiaoLi (TW)

(73) Assignee: Chimel Innolux Corporation, Miao-Li County (TW)

( * ) Notice: Subject to any disclaimer, the term of this patent is extended or adjusted under 35 U.S.C. 154(b) by 1027 days.

(21) Appl. No.: 11/640,004

(22) Filed: Dec. 14, 2006

(65) Prior Publication Data

US 2007/0139573 A1    Jun. 21, 2007

(30) Foreign Application Priority Data

Dec. 16, 2005 (TW) .............................. 94144799 A

(51) Int. Cl.
*G02F 1/1343* (2006.01)
(52) U.S. Cl. .................................................. 349/139
(58) Field of Classification Search ........................ None
See application file for complete search history.

(56) References Cited

U.S. PATENT DOCUMENTS

| 4,917,467 | A | * | 4/1990 | Chen et al. ..................... 349/54 |
| 5,852,482 | A | * | 12/1998 | Kim ............................. 349/46 |
| 6,191,831 | B1 | | 2/2001 | Kim et al. |
| 7,123,315 | B2 | | 10/2006 | Bang et al. |
| 2006/0146245 | A1 | * | 7/2006 | Ahn et al. .................... 349/139 |

FOREIGN PATENT DOCUMENTS

JP         5-315328 A      11/1993

* cited by examiner

*Primary Examiner*—Timothy Rude
(74) *Attorney, Agent, or Firm*—Wei Te Chung

(57) ABSTRACT

An exemplary liquid crystal display (LCD) (20) includes a plurality of scanning lines (21) that are parallel to each other and that each extend along a first direction, and a plurality of data lines (2) that are parallel to each other and that each extend along a second direction different from the first direction. Each scanning line includes a first sub-line (211), a second sub-line (212), and a plurality of connecting portions (213) electrically connecting between the first and second sub-lines. The scanning lines of the LCD each include the first and second sub-lines connected in parallel. Thus the scanning lines have a low resistance. When scanning voltages flow through the scanning lines, any voltage drop is relatively small, and all TFTs (23) of the LCD connected with a same scanning line can be driven by substantially the same voltage. Therefore, the LCD has improved display performance.

12 Claims, 3 Drawing Sheets

US 7,847,902 B2

LIQUID CRYSTAL DISPLAY WITH SCANNING LINES EACH HAVING DUAL PATHS

FIELD OF THE INVENTION

The present invention relates to liquid crystal displays (LCDs), and particularly to an LCD which includes a plurality of scanning lines each having two sub-lines connected in parallel or each including a plurality of openings aligned along a length thereof.

BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace CRT (cathode ray tube) monitors and televisions.

FIG. 5 is a diagram showing part of circuitry of a typical LCD. The LCD 10 includes a first substrate (not shown), a second substrate (not shown) facing the first substrate, a liquid crystal layer (not shown) sandwiched between the first substrate and the second substrate, a gate driver (not shown), and a source driver (not shown).

The first substrate includes a number n (where n is a natural number) of scanning lines 11 that are parallel to each other and that each extend along a first direction, and a number k (where k is also a natural number) of data lines 12 that are parallel to each other and that each extend along a second direction orthogonal to the first direction. The first substrate also includes a plurality of thin film transistors (TFTs) 13 that function as switching elements. The first substrate further includes a plurality of pixel electrodes 15 formed on a surface thereof facing the second substrate. Each TFT 13 is provided in the vicinity of a respective point of intersection of the scanning lines 11 and the data lines 12.

Each TFT 13 includes a gate electrode 131, a source electrode 132, and a drain electrode 133. The gate electrode 131 is connected to the corresponding scanning line 11. The source electrode 132 is connected to the corresponding data line 12. The drain electrode 133 is connected to a corresponding one of the pixel electrodes 15.

The second substrate includes a plurality of common electrodes 16 opposite to the pixel electrodes 15. In particular, the common electrodes 16 are formed on a surface of the second substrate facing the first substrate, and are made from a transparent material such as ITO (indium-tin oxide) or the like. A pixel electrode 15 and a common electrode 16 facing the pixel electrode 15 form a capacitor 17. A pixel electrode 15, a common electrode 16 facing the pixel electrode 15, and liquid crystal molecules of the liquid crystal layer sandwiched between the two electrodes 15, 16 cooperatively define a single pixel unit (not labeled). Each TFT 13 drives a corresponding pixel unit.

When the LCD 10 works, the gate driver provides a scanning voltage to the gate electrode 131 of the TFT 13 via the corresponding scanning line 11, and activates the TFT 13. The source driver provides a gradation voltage to the pixel electrode 15 via the source electrode 132 and the drain electrode 133 of the activated TFT 13 when the scanning line 11 is scanned, thus producing a potential difference between the pixel electrode 15 and the corresponding common electrode 16. The liquid crystal molecules between the pixel and common electrodes 15, 16 are twisted to let light penetrate therethrough. The degree of twisting is proportional to the gradation voltage. In this way, all the pixel units produce various degrees of light penetration, which together make up an image that is displayed on a screen of the LCD 10.

The scanning lines 11 are generally very thin, and therefore have relatively high essential resistances. When the scanning voltages flow through the scanning lines 11, voltage drops tend to occur. In particular, the voltage drop increases with increasing distance away from the gate driver. That is, a voltage driving a TFT 13 distal from the gate driver is frequently less than a voltage driving a TFT 13 close to the gate driver. Thus, the LCD 10 may have a degraded display performance.

Therefore, a new LCD that can overcome the above-described deficiencies is desired.

SUMMARY

In one preferred embodiment, a liquid crystal display includes a plurality of scanning lines that are parallel to each other and that each extend along a first direction, and a plurality of data lines that are parallel to each other and that each extend along a second direction different from the first direction. Each scanning line includes a first sub-line, a second sub-line, and a plurality of connecting portions electrically connecting between the first and second sub-lines.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the present invention in detail.

Figure 1:
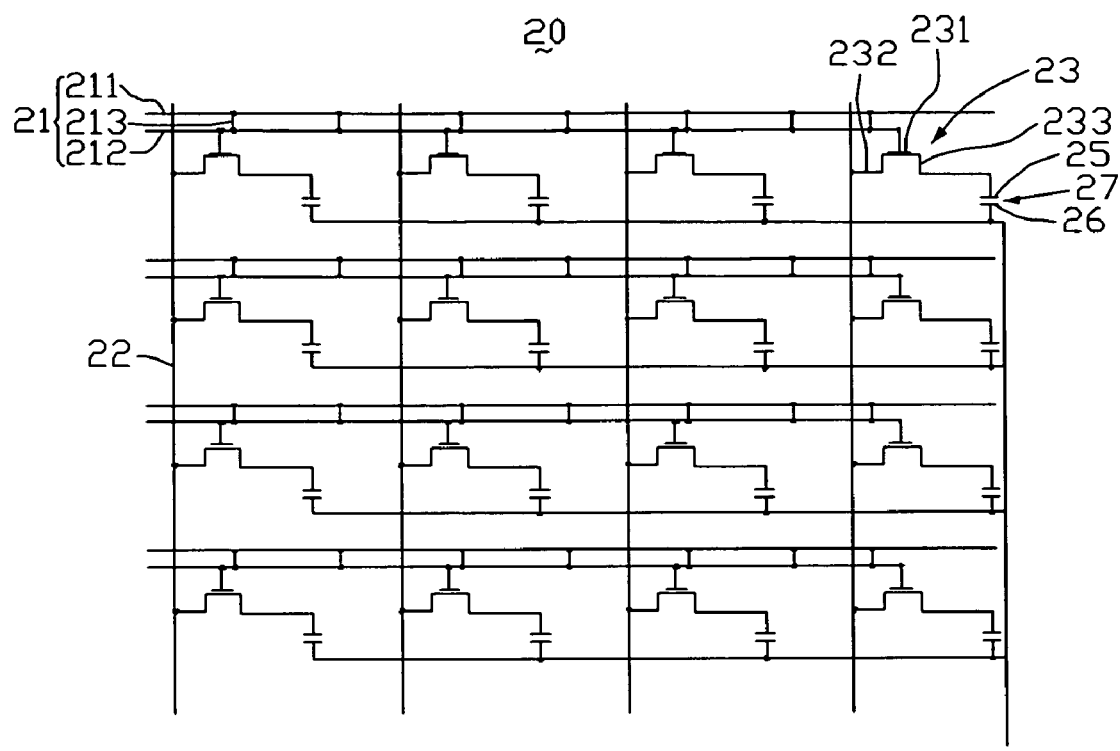
FIG. 1 is a diagram showing part of circuitry of an LCD according to a first embodiment of the present invention, the LCD including a plurality of scanning lines.

Referring to FIG. 1, part of circuitry of an LCD 20 according to a first embodiment of the present invention is shown. The LCD 20 includes a first substrate (not shown), a second substrate (not shown) facing the first substrate, a liquid crystal layer (not shown) sandwiched between the first substrate and the second substrate, a gate driver (not shown), and a source driver (not shown).

The first substrate includes a number n (where n is a natural number) of scanning lines 21 that are parallel to each other and that each extend along a first direction, and a number k (where k is also a natural number) of data lines 22 that are parallel to each other and that each extend along a second direction orthogonal to the first direction. The first substrate also includes a plurality of thin film transistors (TFTs) 23 that function as switching elements. The first substrate further includes a plurality of pixel electrodes 25 formed on a surface thereof facing the second substrate. Each TFT 23 is provided in the vicinity of a respective point of intersection of the scanning lines 21 and the data lines 22.

Each TFT 23 includes a gate electrode 231, a source electrode 232, and a drain electrode 233. The gate electrode 231 is connected to the corresponding scanning line 21. The source electrode 232 is connected to the corresponding data line 22. The drain electrode 233 is connected to a corresponding one of pixel electrodes 25.

The second substrate includes a plurality of common electrodes 26 opposite to the pixel electrodes 25. In particular, the common electrodes 26 are formed on a surface of the second substrate facing the first substrate, and are made from a transparent material such as ITO (indium-tin oxide) or the like. A pixel electrode 25 and a common electrode 26 facing the pixel electrode 25 form a capacitor 27. A pixel electrode 25, a common electrode 26 facing the pixel electrode 25, and liquid crystal molecules of the liquid crystal layer sandwiched between the two electrodes 25, 26 cooperatively define a single pixel unit (not labeled). Each TFT 23 drives a corresponding pixel unit.

Figure 2:
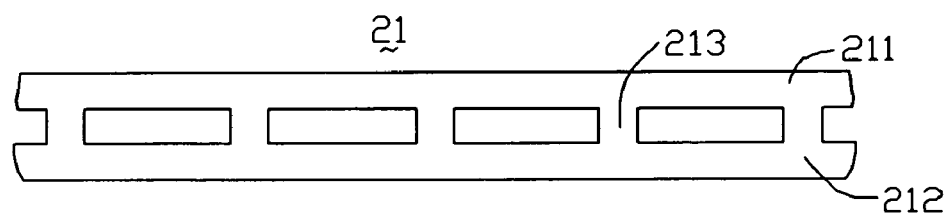
FIG. 2 is an enlarged, top plan view of part of one of the scanning lines of the LCD of FIG. 1.

Referring also to FIG. 2, part of one scanning line 21 of the LCD 20 is shown. The scanning line 21 includes a first sub-line 211, a second sub-line 212, and a plurality of connecting portions 213. The first sub-line 211 is parallel to the second sub-line 212. The connecting portions 213 are connected between the first and second sub-lines 211, 212, and are parallel to each other. A predetermined interval is defined between adjacent connecting portions 213. The predetermined interval is less than an interval between adjacent data lines 22. Preferably, the predetermined interval of the connecting portions 213 is less than a half of the interval between adjacent data lines 22. The first sub-line 211, the second sub-line 212, and the connecting portions 213 can be made of metal, such as copper, aluminum or an electrically conductive alloy.

Because the first and second sub-lines 211, 212 are connected in parallel, an essential resistance R0 of the scanning line 21 satisfies the following equation: $R_0 = R_1 R_2 / (R_1 + R_2)$, wherein $R_1$ represents a resistance of the first sub-line 211, and $R_2$ represents a resistance of the second sub-line 212. That is, $R_0$ is less than R1 and R2, and when $R_1$ is equal to $R_2$, $R_0$ is equal to $R_1/2$.

When the LCD 20 works, the gate driver provides a scanning voltage to the gate electrode 231 of the TFT 23 via the corresponding scanning line 21, and activates the TFT 23. The source driver provides a gradation voltage to the pixel electrode 25 via the source electrode 232 and the drain electrode 233 of the activated TFT 23 when the scanning line 21 is scanned, thus producing a potential difference between the pixel electrode 25 and the corresponding common electrode 26. The liquid crystal molecules between the pixel and common electrodes 25, 26 are twisted to let light penetrate therethrough. The degree of twisting is proportional to the gradation voltage. In this way, all the pixel units produce various degrees of light penetration, which together make up an image that is displayed on a screen of the LCD 20.

In summary, the scanning lines 21 of the LCD 20 each include the first and second sub-lines 211, 212 connected in parallel. Thus the scanning lines 21 have a low resistance. When the scanning voltages flow through the scanning lines 21, any voltage drop is relatively small, and all the TFTs 23 connected with a same scanning line 21 can be driven by substantially the same voltage. Therefore, the LCD 20 has improved display performance.

In addition, the dual sub-lined scanning lines 21 can be advantageous if a short circuit occurs thereat. For example, a short circuit may occur due to a defective portion of the first sub-line 211 of one of the scanning lines 21. In such case, a laser light can be used to cut off the defective portion of the first sub-line 211. After this procedure, the LCD 20 can still work because the second sub-line 212 can work normally. Thus, the dual sub-lined scanning lines 21 can be conveniently repaired in the event of short circuits occurring.

Figure 3:
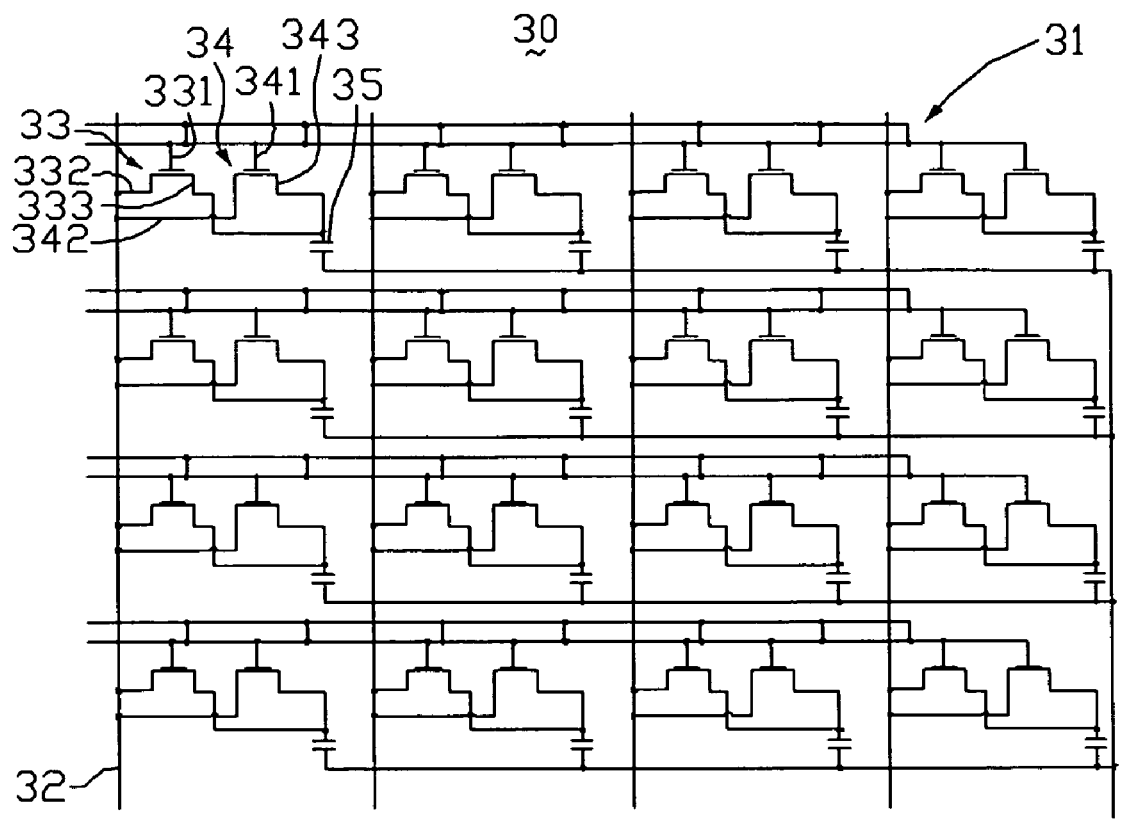
FIG. 3 is a diagram showing part of circuitry of an LCD according to a second embodiment of the present invention, the LCD including a plurality of scanning lines.

Referring to FIG. 3, part of circuitry of an LCD 30 according to a second embodiment of the present invention is shown. The LCD 30 is similar to the LCD 20 of the first embodiment. However, each pixel unit of the LCD 30 is driven by two TFTs 33, 34. Gate electrodes 331, 341 of the TFTs 33, 34 are connected to a corresponding one of scanning lines 31. Source electrodes 332, 342 of the TFTs 33, 34 are connected to corresponding one of data lines 32. Drain electrodes 333, 343 of the TFTs 33, 34 are connected in common to a corresponding single pixel electrode 35.

Because each pixel unit is driven by the two TFTs 33, 34, if one of the TFTs 33, 34 fails or is defective, a laser light can be used to cut off the gate, source, and drain electrodes of the bad TFT 33, 34, so as to ensure that the other TFT 33, 34 can properly drive the pixel unit by itself.

Figure 4:
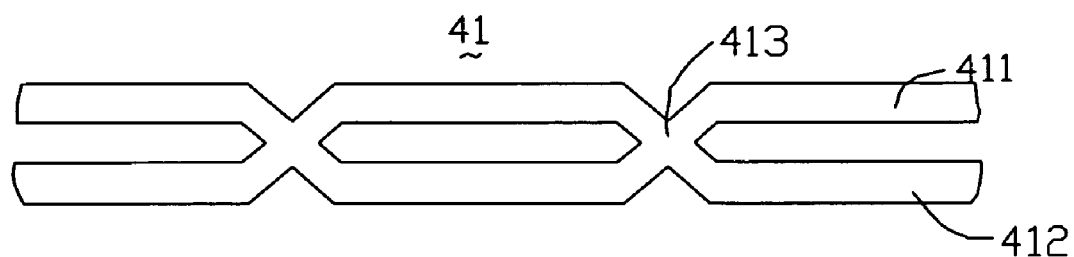
FIG. 4 is similar to FIG. 2, but showing a corresponding view in the case of part of one scanning line of an LCD according to a third embodiment of the present invention.
Figure 5:
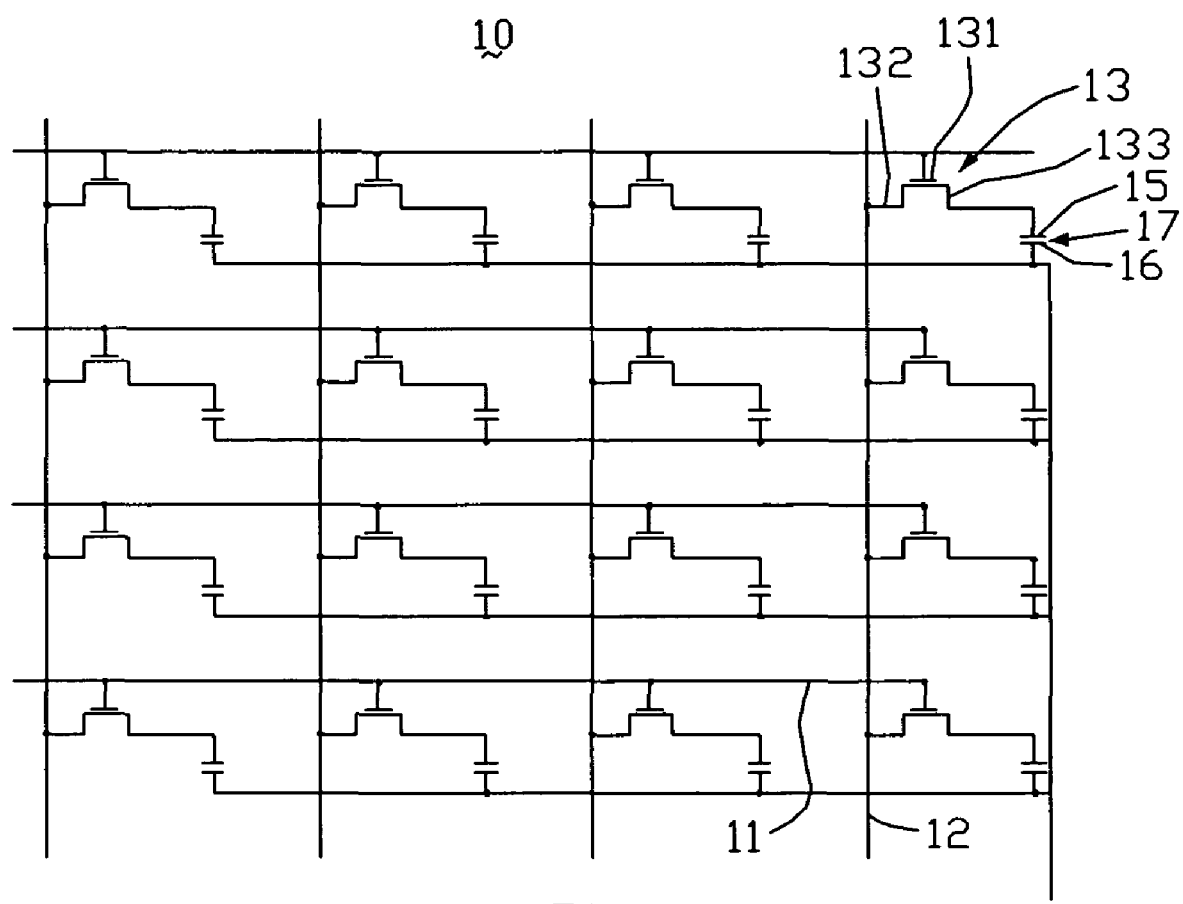
FIG. 5 is a diagram showing part of circuitry of a conventional LCD.

Referring to FIG. 4, part of one scanning line of an LCD according to a third embodiment of the present invention is shown. The scanning line 41 is similar to the scanning line 21 of the LCD 20 of the first embodiment. However, the scanning line 41 includes a first sub-line 411, a second first sub-line 412, and a plurality of X-shaped connecting portions 413. The X-shaped connecting portions 413 each include four ends respectively connected with the first and second sub-lines 411, 412.

Further or alternative embodiments may include the following. In one example, an interval between adjacent connecting portions can be equal to or greater than an interval between adjacent data lines. In another example, each scanning line can be a single, elongate body with a plurality of openings periodically defined therealong.

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display (LCD), comprising:
a plurality of scanning lines that are parallel to each other and that each extend along a first direction, each scanning line comprising a first sub-line, a second sub-line, and a plurality of connecting portions electrically connecting between the first and second sub-lines; and
a plurality of data lines that are parallel to each other and that each extend along a second direction different from the first direction;
wherein the connecting portions are parallel to each other, and an interval between adjacent connecting portions is greater than an interval between adjacent data lines.

2. The LCD as claimed in claim 1, wherein the second direction is orthogonal to the first direction.

3. The LCD as claimed in claim 1, further comprising a plurality of thin film transistors, each of which is provided in the vicinity of a respective point of intersection of the scanning lines and the data lines, and each of which includes a gate electrode connected to the corresponding scanning line, a source electrode connected to the corresponding data line, and a drain electrode.

4. The LCD as claimed in claim 3, further comprising a first substrate, a second substrate, a liquid crystal layer sandwiched between the first and second substrates, a plurality of pixel electrodes provided at the first substrate, and a plurality of common electrodes provided at the second substrate respectively facing the pixel electrodes, wherein each pixel electrode is connected to the drain electrode of a corresponding thin film transistor, and a pixel electrode, a common electrode facing the pixel electrode, and liquid crystal molecules of the liquid crystal layer sandwiched between the pixel and common electrodes cooperatively define a single pixel unit.

5. The LCD as claimed in claim 4, wherein each pixel unit is driven by the corresponding thin film transistor.

6. The LCD as claimed in claim 4, wherein each pixel unit further comprises a second thin film transistor, the second thin film transistor comprises a drain electrode, and the drain electrodes of the two thin film transistors of the pixel unit are connected in common to the corresponding pixel electrode of the pixel unit.

7. The LCD as claimed in claim 4, wherein the first sub-line and the second sub-line of a same scanning line are adjacent to each other.

8. The LCD as claimed in claim 7, wherein in each pixel unit, the gate electrode of the thin film transistor is connected to one of the first sub-line and the second sub-line, and the drain electrode of the thin film transistor is connected to the pixel electrode which is located in a same pixel unit with the thin film transistor.

9. The LCD as claimed in claim 1, wherein the first sub-line is parallel to the second sub-line.

10. The LCD as claimed in claim 1, wherein a resistance of the first sub-line is equal to a resistance of the second sub-line.

11. The LCD as claimed in claim 1, wherein the scanning lines are made of metal.

12. The LCD as claimed in claim 1, wherein each of the first sub-line, the second sub-line, and the connecting portions is made from material selected from the group consisting of copper, aluminum, and an electrically conductive alloy.

* * * * *